(No Model.)
T. SIMON.
MIRROR MAGNIFYING GLASS.
No. 426,869. Patented Apr. 29, 1890.
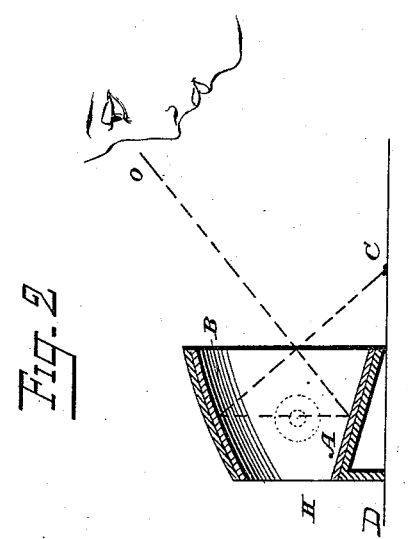
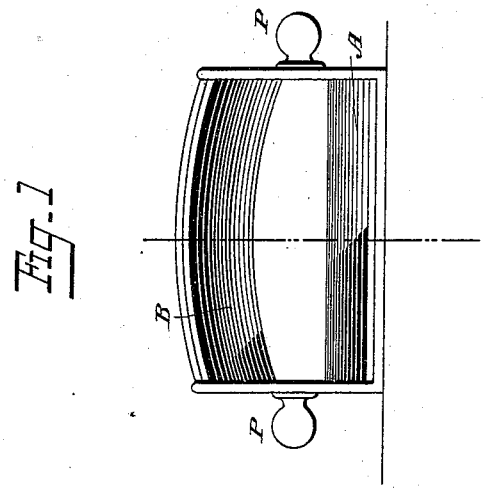
WITNESSES:
E. B. Bolton
E. L. Richards
INVENTOR:
Theodore Simon
By Richards
his Attorneys.

UNITED STATES PATENT OFFICE.

THÉODORE SIMON, OF PARIS, FRANCE.

MIRROR MAGNIFYING-GLASS.

SPECIFICATION forming part of Letters Patent No. 426,869, dated April 29, 1890.

Application filed March 5, 1889. Serial No. 301,997. (No model.) Patented in France January 5, 1889, No. 195,187, and in England January 9, 1889, No. 418.

*To all whom it may concern:*

Be it known that I, THÉODORE SIMON, a citizen of the French Republic, residing at Paris, in said Republic, have invented a new and useful Mirror Magnifying-Glass, (patented in France January 5, 1889, No. 195,187; provisional application filed in England January 9, 1889, No. 418,) of which the following is a full, clear, and exact description.

This optical instrument for which a patent is sought can be applied with advantage in a good many cases in the place of the ordinary magnifying-glass which is formed of one lens, and which is used for the examination of objects, signs, or very small letters, and has a strong magnifying-power. For this reason I call my instrument a "magnifying-glass," notwithstanding it is made of mirrors, as will be hereinafter explained.

The magnifying-glasses made of a glass lens produce a magnifying effect by forming a virtual image of the examined object, the luminary rays of which only reach the eye after having crossed the glass, which weakens them considerably. On the other hand, the field of view is rather limited. The glass, the object which is to be examined, and the eye of the examiner must assume relative positions and distances which cannot be changed to any extent, and for reading very small text particularly it is very inconvenient that the eye should be compelled to keep within such a slight variable distance. For these reasons I propose to substitute for the lens reflecting-mirrors selected and arranged in such a manner as to produce a strong magnifying effect and without any perceptible weakening of the luminary rays.

By the following arrangement I have formed a plain and convenient instrument for the purpose stated.

Among other advantages my instrument does not prevent the light from falling on the object which is to be examined, and it enables me to read a very small text without the necessity of moving it in a lateral direction and without compelling the eye to remain at a certain distance.

In the accompanying drawings, which form a part of this description, and in which like parts are indicated by like letters of reference, Figure 1 shows a front elevation of the instrument, and Fig. 2 a transverse section of the same.

The apparatus is composed of a curved mirror B and of a flat mirror A, arranged one above the other and forming a suitable angle, so that the object which is to be examined being placed at C on the plane C D, its image is reflected and magnified by the curved mirror B and reflected and transmitted by the flat mirror A to the eye O of the observer. This travel of the luminary rays is indicated by the lines C B A O.

According to the optic laws the magnifying of the object depends upon the curving of the mirror. With a suitable curving it will be easy to embrace in the field of view of the concave mirror a latitude of text sufficient to render a motion of the instrument in a lateral direction superfluous, so that it will be sufficient to move it only forward and backward.

It is evident that when the written or printed page is placed before the observer on the plane D C it will be sufficient to place the mirror magnifying-glass a little higher and to look in the flat mirror, taking at the same time a convenient position and distance.

As the apparatus is open at the back H, the object which is read is lighted from nearly all sides, which makes the reading still easier.

Provided with slightly-curved mirrors, my instrument can be used for the examination of a field of view of little extent. The flat mirror can also be replaced by a curved one, which will also change the dimensions of the reflected image.

The two mirrors are, as shown in the drawings, arranged on their frame, and the two frames are kept in a suitable position by two lateral plates, each provided with a knob or ear P.

The mirrors can be made of foliated glass or any other substance ordinarily used for such purposes, or be entirely metallic, silvered, or silver-plated.

The frame can be provided with handles, rings, or other means, according to the use that is to be made of the instrument.

Having thus fully described my invention, what I claim as new, and desire to secure by Letters Patent of the United States, is—

1. As an improved article of manufacture, the herein-described reading and magnifying glass having the plane and concave mirrors A and B and an open supporting-frame holding the said mirrors at an angle to each other and adapted to support the device upon a plane surface, substantially as set forth.

2. As an improved article of manufacture, the herein-described reading and magnifying glass having the plane and concave mirrors A and B and a supporting-frame holding the said mirrors at an angle to each other and provided with the handles P P, substantially as set forth.

In testimony that I claim the foregoing I have hereunto set my hand.

THÉODORE SIMON.

Witnesses:
EMILE LEVESQUY,
R. J. PRESTON.